Patented Jan. 21, 1947

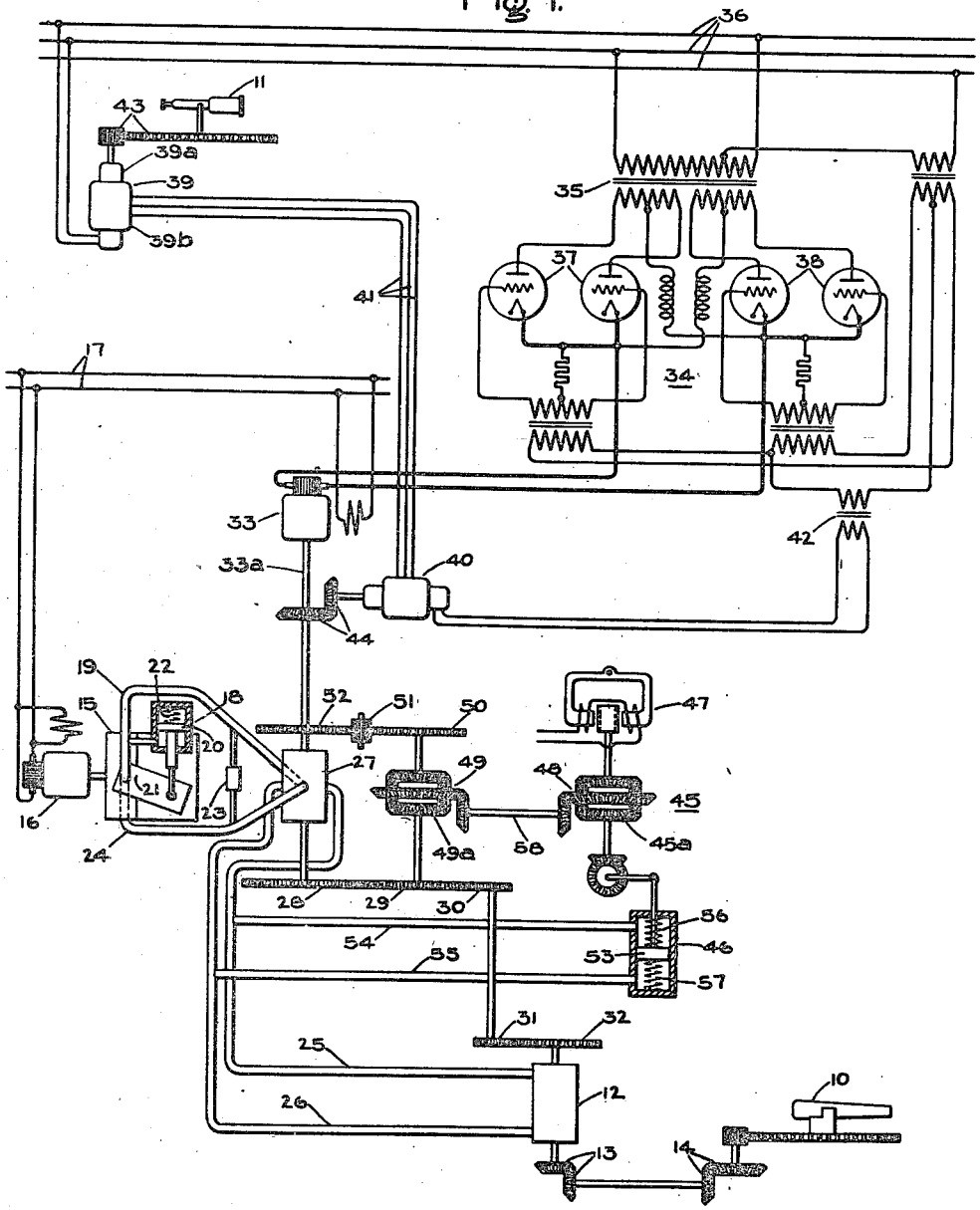

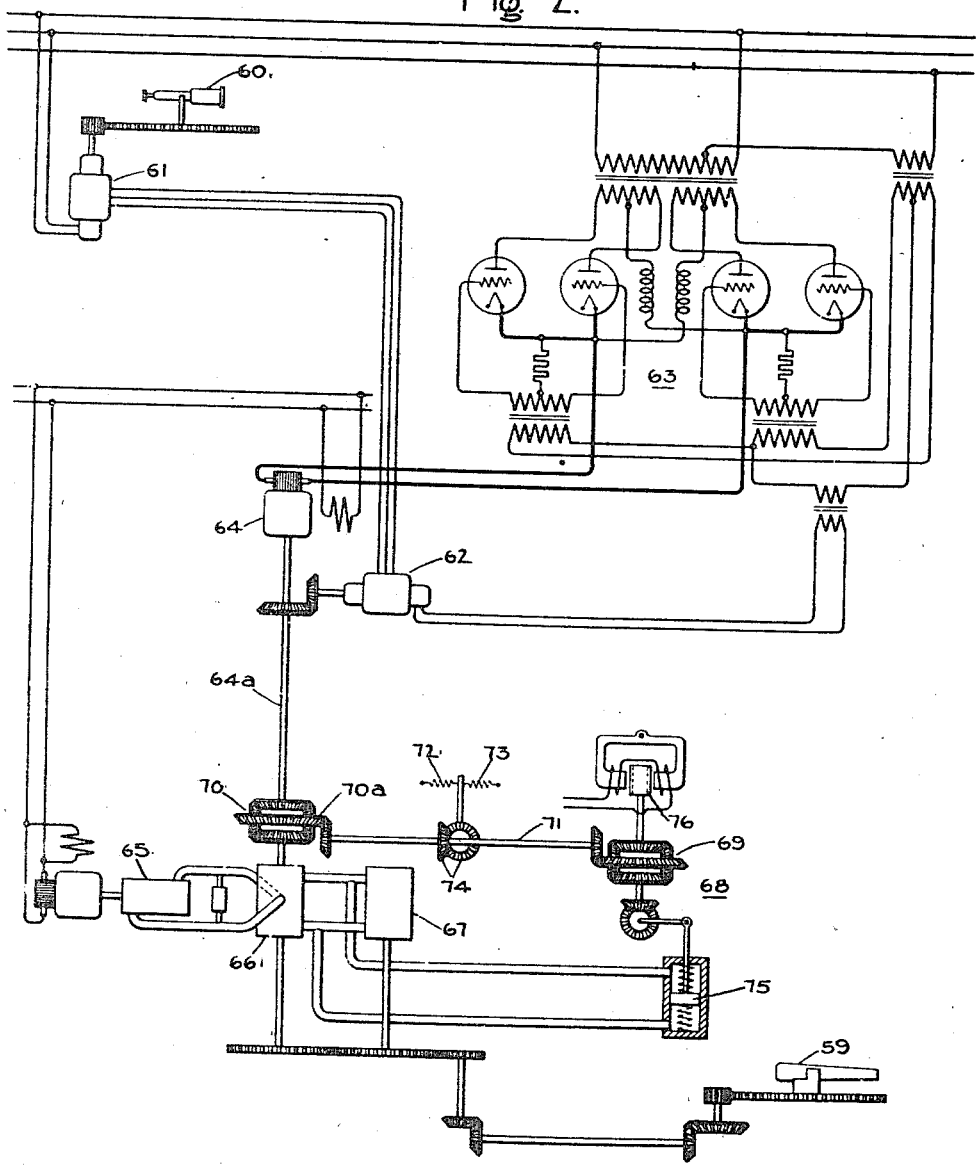

2,414,690

UNITED STATES PATENT OFFICE 2,414,690

POSITIONAL CONTROL SYSTEM

Martin A. Edwards, Schenectady, N. Y., assignor to General Electric Company, Schenectady, N. Y., a corporation of New York Application June 23, 1936, Serial No. 86,793
Renewed January 12, 1939

13 Claims. (Cl. 60—53)

This invention relates to control systems, more particularly to follow-up control systems for driving an object in positional agreement with a pilot device, and it has for an object the provision of a simple, reliable, and improved system of this character.

More specifically, the invention relates to follow-up control systems in which hydraulic driving means are utilized for driving the driven object, and a more specific object of the invention is the provision of a sensitive and accurate control, together with means for preventing oscillation or "hunting." In one of its aspects, this invention constitutes an improvement of the hydraulic follow-up control system disclosed in application Serial No. 81,426, Ernst F. W. Alexanderson, filed May 23, 1936, and assigned to the same assignee.

In carrying the invention into effect in one form thereof, a fluid motor is connected to drive an object in positional agreement with a pilot device. Fluid is supplied to the motor from a pump, and a valve is included in the supply connections between the pump and motor for controlling the supply of fluid to the motor. Means responsive to positional disagreement of the pilot device and driven object are provided for actuating the valve to control the fluid motor to drive the driven object toward correspondence with the pilot device, and means responsive to the rate of change of torque of the fluid motor are provided for producing an opposing actuation of the valve in order to prevent the system from hunting.

In illustrating the invention in one form thereof, it is shown as embodied in a system for controlling the driving of a gun in positional agreement with a telescope. It will be understood, however, that the invention has other applications.

For a better and more complete understanding of the invention, reference should now be had to the following specification and to the accompanying drawings in which Fig. 1 is a simple diagrammatical representation of an embodiment of the invention and Fig. 2 is a modification.

Referring now to the drawings, an object such as the gun 10 is to' be driven in accurate correspondence with a pilot device, such as the telescope 11.

The gun 10 is driven by suitable hydraulic driving means such as the fluid motor 12 to whose output shaft the gun 10 is connected through gearing 13 and 14. Any suitable fluid, such as oil is supplied under pressure to the motor 12 from a pump 15 that is driven by suitable driving means, illustrated as an electric motor 16, at a speed that is preferably substantially constant. Although the motor 16 may be of any suitable type, it is illustrated as a direct current type motor and is supplied with power from a suitable direct current source such as represented by the supply lines 17.

The pump 15 is shown conventionally because its specific structure constitutes no part of the invention. This pump is preferably a positive displacement type pump and may be either a constant stroke pump or a variable stroke pump. The pump 15 is conventionally illustrated as a variable stroke pump and is provided with means 18 for varying the stroke of the pump in response to the fluid pressure developed by the pump for maintaining the fluid pressure substantially constant. The stroke control mechanism 18 of the pump is illustrated as comprising a cylinder having communication with the output connection 19 of the pump and a movable piston 20 connected to the cylinder block structure 21. A spring 22 is provided within the cylinder for balancing the mechanism 18 against the fluid pressure so that when the fluid pressure changes, the piston is actuated in one direction or the other to move the cylinder block of the pump about its pivot and thereby vary the stroke of the pump so as to maintain the fluid pressure substantially constant. A pressure relief valve 23 is connected across the output and intake connections of the pump for preventing the building up of destructive pressure. Suitable pumps of the type described in the foregoing are well-known and are available on the market. For the purposes of the present invention, it is sufficient to understand that the pump 15 supplies a volume of fluid to the motor 12 and that the fluid pressure is maintained substantially constant. The output and the intake of the pump are connected to the fluid motor 12 by means of connections 19 and 24 and 25 and 26. Suitable means illustrated as a differential type valve 27 are included in these connections for controlling the amount of fluid supplied to motor 12. This differential valve 27 has two cooperating elements (not shown) one of which is actuated by movement of pilot device 11 and the other of which is actuated by the fluid motor 12 to which it is connected through gearing 28, 29, 30, 31 and 32.

The element of the valve 27 that is actuated by the pilot device, is connected to a pilot motor 33. This motor is illustrated as a direct current type motor supplied from suitable electric valve apparatus 34, which in turn is supplied through a supply transformer 35 from a suitable source of alternating voltage represented by the three supply lines 36. The valve apparatus 34 comprises two pairs of valves 37 and 38. Each pair of valves is connected for full wave rectification, and has its output circuit connected to the armature of the pilot motor 33. The pair of valves 37 when energized supplies current to the armature of motor 33 in one direction, and the other pair when energized supplies current in the reverse direction, and thus when either pair of valves is energized, the motor 33 is energized for rotation in a corresponding direction.

For the purpose of controlling the energization of the electric valve apparatus, suitable rotary induction apparatus is provided. This apparatus which is similar to electrical motion transmitting apparatus comprises an electrical transmitting device 39 and an electrical receiving device 40. The transmitting device 39 has a rotor member 39a provided with a single phase winding (not shown) and a stator member 39b having a three-element winding (not shown) that is physically similar to a distributed three-phase winding. The receiver 40 is identical with the transmitter. As shown, the rotor winding of the transmitter is connected to the upper and middle supply line 36 and the stator windings of the two devices are connected together by means of conductors 41. The rotor winding of the receiver 40 is connected through the grid transformer 42 to the grid or input circuit of the electric valve apparatus. The rotor member 39a of the transmitter is connected through gearing 43 to the pilot device, i. e. telescope 11, and the rotor member of the receiver 40 is connected through gearing 44 to the shaft of the pilot motor 33.

When the telescope 11 and the shaft of pilot motor 33 are in positions of correspondence, no voltage is supplied through the transmitter 39 and receiver 40 to the grid or input circuit of the electric valve apparatus 34. As a result, the valve apparatus is deenergized and the motor 33 is at rest. When the telescope 11 is rotated in either direction a voltage is supplied to the grid circuit of the valve apparatus which energizes one or the other of the pairs of valves depending upon the direction of rotation of the telescope. This causes the motor 33 to rotate in a corresponding direction, thereby rotating the rotor member of the receiver 40 toward a position of correspondence with the rotor of the transmitter 39. When this position of correspondence is reached, no voltage is supplied to the grid circuit of the electric valve apparatus through the transformer 42 and consequently the electric valve apparatus is deenergized and motor 33 comes to rest. The load on the motor 33 is so small that the velocity lag between the shaft 33a of the motor and the telescope is negligible. In other words, the shaft of motor 33 is always in substantial correspondence with the telescope 11, both when the telescope is moving and when it is at rest.

As pointed out in the foregoing, the pilot motor 33 is connected to one element of the differential valve 27 and thus when the motor 33 rotates, the valve 27 is actuated to cause the pump 15 to supply fluid to the fluid motor 12 in a direction corresponding to the direction of rotation of the pilot motor 33. The ratio of the gearing 28, 29, 30, 31 and 32 is such that when the gun 10 has been rotated through an angle equal to that through which the telescope 11 has been rotated, the second element of the differential valve 27 will have been rotated to a position to close the valve and thus the gun 10 is brought to rest in substantial correspondence with the telescope 11.

In order to prevent oscillations or hunting, means 45 are provided for introducing a correction in the control responsive to the rate of change of torque of the driving means. This anti-hunting means 45 is illustrated as comprising a pressure responsive device 46 and a damping device 47 connected together through a differential device 48 having an output member connected through a differential device 49 and gearing 50, 51 and 52 to the shaft 33a of the pilot motor.

The pressure responsive device 46 comprises a cylinder having a movable piston 53 and connections 54, 55 from opposite sides of the piston to the input and output connections 25, 26 of the fluid motor 12. The springs 56, 57 serve to maintain the piston 53 in a central position when the fluid pressure drop across the motor 12 is substantially zero.

The damping device 47 is illustrated as an eddy current brake having a magnetic structure provided with an air gap and a rotor member mounted for rotation in the air gap. This device develops a torque proportional to speed.

In a closed hydraulic system comprising a fluid motor supplied from a pump, the torque of the fluid motor is a function of the fluid pressure of the system. Accordingly, if the anti-hunting means 45 is made responsive to the rate of change of fluid pressure, it will also be responsive to the rate of change of torque of the fluid motor. When the fluid pressure across the fluid motor 12 changes, the piston 53 moves at a speed proportional to this change. Since the piston 53 is connected to the input gear 45a of the differential device 45, the rotor member of the eddy current brake 47 is rotated at a speed proportional to the speed of the piston. The eddy current brake develops a torque proportional to its speed which is proportional to rate of change of torque of the fluid motor 12. The output member 48 of the differential device 45 is connected through shaft 58 to the input member of differential device 49 and consequently there is imposed upon this shaft 58 a torque equal to the torque developed by the eddy current brake and therefore proportional to the rate of change of torque of the fluid motor 12. The torque imposed upon the shaft 58 is transmitted through differential device 49 and gearing 50, 51 and 52 to the shaft 33a connecting the pilot motor 33 and one member of the control valve 27.

With the foregoing understanding of the apparatus and its organization in the system, the operation of the system itself will readily be understood from the following detailed description.

Assuming the system to be at rest, with the gun 10 in a position of correspondence with telescope 11, the control will be deenergized and the various parts in the positions in which they are illustrated. Rotation of telescope 11 energizes one or the other of the pairs of electric valves 37, 38 depending upon the direction of rotation of the telescope, and causes the motor 33 to rotate the shaft 33a in substantial synchronism with the telescope. Rotation of the shaft 33a actuates the valve 27 to open it in such a direction as to cause the fluid motor 12 to drive the gun toward correspondence with the telescope 11. It will also be noted that when the shaft 33a begins to rotate, the gear 49a of differential device 49 is held against rotation by the motor 12 and the gun 10 and therefore the rotor of the eddy current brake 47 is driven through differential devices 49 and 48; but this exerts no controlling function on the system because the gear ratio between shaft 58 and the shaft of the eddy current device 47 is low in comparison with the gear ratio between the movable piston 53 and the shaft of the eddy current device.

As the control valve 27 is opened, the pressure of the fluid in the system, i. e., the fluid pressure across the fluid motor 12 rises very abruptly and almost instantaneously to a high value. This means that a very high torque is being applied to accelerate the mass of the gun. Now, if this high torque were applied to the gun indefinitely, the gun 10 would be accelerated so rapidly that it would over-shoot the position of correspondence of the telescope and would thus give rise to a condition of sustained oscillation or hunting. However, as the pressure starts to rise, and assuming the upper connection 25 between the valve 27 and the motor 12 to be the high pressure side, the piston 53 starts to move downwardly. As pointed out in the foregoing, the piston 53 moves downwardly at a rate proportional to the rate of change of pressure drop across the fluid motor 12 and therefore proportional to the rate of change of torque of the fluid motor. This movement of the piston 53 is transmitted through the differential device 48 to effect a rotation of the rotor of the damping device 47 and to impose upon the connecting shaft 58 a torque proportional to the rate of change of torque of the fluid motor 12. This torque imposed upon the shaft 58 is transmitted through differential device 49 and gearing 50, 51 and 52 to the valve shaft 33a and thus opposes the opening torque applied to the valve 27 by the pilot motor 33. The result is that the shaft 33a is slowed considerably and thus the element of the valve 27 to which it is connected is more rapidly overtaken by the other element of the valve 27 driven by the fluid motor 12 through gearing 28, 29, 30, 31 and 32. This has the effect of tending to close the valve 27 rapidly and reducing the volume of fluid supplied to the motor 12 and thereby reducing the fluid pressure and torque of the motor 12 sufficiently to prevent over-shooting.

At this point, it will be noted that immediately upon positional disagreement of the telescope and gun the fluid pressure and motor torque rise quickly to a high value and a time interval afterward, the anti-hunting means 45 operates to oppose or reduce this rapid increase in torque. As the fluid pressure drop across the motor 12 approaches a steady value, the piston 53 finally comes to rest at a position displaced from its central position an amount proportional to the pressure drop across the fluid motor 12. When the piston 53 finally comes to rest, the rotor member of the damping device 47 also comes to rest and thus no correcting torque is transmitted through the shaft 58, differential device 49 and gearing 50, 51 and 52 to the control valve 27. When the correcting torque is removed from the valve shaft 33a, the motor 33 again increases its speed sufficiently to open the valve 27 an amount such that the volume of fluid supplied to the motor 12 will drive the gun 10 at a speed proportional to the speed of the pilot motor 33 and therefore equal to the speed of the telescope 11.

Before the fluid pressure drop across the fluid motor 12 reaches a steady condition, it may pass through several transient conditions. But each time that the fluid pressure drop across the motor 12 changes, the anti-hunting mechanism 45 responds to this change and applies a correction to the controlling valve that is responsive to the rate of change of torque of the fluid motor 12. It will also be noted that the anti-hunting mechanism does not introduce corrections under steady state conditions of fluid pressure or correspondence; it only introduces corrections when the pressure or torque is changing, and these corrections, as stated, are proportional to the rate of change of torque of motor 12.

As the gun 10 is accelerated by the torque of the fluid motor 12, it begins to catch up with the shaft 33a thereby acting through the gearing 28, 29, 30, 31 and 32 to close the valve 27. When the telescope is finally brought to rest, the control valve 27 will be completely closed and the gun 10 will be brought to rest in correspondence with the telescope. This deceleration will bring about changes in the pressure drop across the fluid motor 12 and as before, the anti-hunting mechanism will respond to these changes and introduce the necessary correction.

The modified system shown in Fig. 2 is very similar to the system shown in Fig. 1. In this connection, it will be noted that the gun 59, telescope 60, rotary induction apparatus 61, 62, electric valve apparatus 63, pilot motor 64, pump 65, control valve 66, fluid motor 67, and anti-hunting mechanism 68 are substantially identical with the corresponding elements of Fig. 1. The system of Fig. 2 differs from that of Fig. 1 in the manner in which the anti-hunting correction is introduced and applied to the control valve 66. Instead of being connected directly to the valve shaft 64a, the output element of the differential device 69 is connected to the input element 70a of a differential device 70 which is included in the shaft connections 64a between the pilot motor 64 and one element of the controlling valve 66. The output element of differential device 69 and input element of differential device 70 are connected by means of a shaft 71. Springs 72 and 73 are connected through bevel gearing 74 to the shaft 71 and thus these springs serve to maintain the shaft 71 in a predetermined position when no torque is applied to it and to limited rotation to a position proportional to any torque that may be applied to it. When the telescope 60 is rotated, the shaft 64a is likewise rotated in correspondence with the telescope. Since the element 70a of the differential device 70 is held against rotation by means of springs 72, 73, the control valve 66 is open and fluid is supplied from the pump 65 to the motor 67 in such a direction that the motor 67 drives the gun 59 toward correspondence with the telescope 60. As the fluid pressure drop across the fluid motor 67 begins to change, the piston 75 begins to move at a speed proportional to the change in pressure drop and drives the rotor member of the eddy current brake at a speed that is proportional to the rate of change of fluid pressure drop and therefore proportional to the rate of change of torque of the driving motor 67. The damping device develops a torque that is proportional to its speed and this torque is appied to the shaft 71 which is rotated against the force of the springs 72, 73 to a position proportional to the torque applied to the shaft 71 and therefore proportional to the rate of change of torque of the fluid motor 67. Rotation of the shaft 71 through this angle rotates the input member 70a of the differential device 70 through an equal angle. The arrangement of the differential devices 69 and 70 is such that this rotation of the input member 70a rotates the controlling element of the valve 66 in a direction opposite to that in which it was rotated as a result of the energization of motor 64. This results in closing the valve 66 a proportional amount and reducing the volume and pressure of the fluid supplied to the motor 67. The result of this is to prevent over-shooting or hunting as explained in connection with Fig. 1.

Thus, it will be seen that when the telescope 60 is rotated to open the valve 66 and thereby produce a change in the pressure drop across the fluid motor 67, the anti-hunting mechanism 68 responds to this change in pressure drop and applies a closing action to the valve proportional to the rate of change of pressure drop across the fluid motor.

In all other respects the operation of the modified system of Fig. 2 is identical with that of the system of Fig. 1.

Although in accordance with the provisions of the patent statutes, this invention is described as embodied in concrete form, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. Means for reproducing position comprising a pilot device, a driven object, hydraulic driving means for said object comprising a fluid motor connected to said object and a valve for controlling the supply of fluid to said motor, means responsive to positional disagreement of said pilot device and driven object for actuating said valve to control said motor to drive said object toward correspondence with said device, and anti-hunting means responsive to the rate of change of torque of said driving means for actuating said valve oppositely to the actuation produced by said positional disagreement.

2. A follow-up control system for driving an object in positional agreement with a pilot device comprising hydraulic driving means for said object, said driving means comprising a fluid motor connected to said object, a pump and connections between said pump and motor, means for controlling the supply of fluid to said motor comprising a differential valve in said connections having an element actuated in response to movement of said pilot device and a second element actuated in response to movement of said object, means responsive to positional disagreement of said device and object for actuating said valve to control said motor to drive said object toward correspondence with said device.

3. A follow-up system comprising a pilot device, a driven object, hydraulic driving means for said object comprising a fluid motor connected to said object and a pump for supplying fluid under pressure to said motor, a valve in the supply connections between said pump and motor, said valve having an element arranged to be actuated in response to movement of said pilot device to open said valve and a second element connected to be actuated by movement of said object to close said valve whereby said valve is opened an amount dependent upon the positional disagreement of said device and object, and anti-hunting means for actuating said valve oppositely to the actuation produced by positional disagreement of said device and object.

4. A follow-up system comprising a pilot device, a driven object, hydraulic driving means for said object comprising a fluid motor connected to said object, a variable stroke pump and connections between said pump and motor, a valve in said connections for controlling the supply of fluid to said motor, means responsive to positional disagreement of said device and object for actuating said valve to control said motor to drive said object toward correspondence with said pilot device, and means responsive to pressure of said fluid for controlling the stroke of said pump.

5. A follow-up control system comprising a pilot device, a driven object, hydraulic driving means for said object comprising a fluid motor connected to said object, a variable stroke pump and connections between said pump and motor, a valve in said connections for controlling the supply of fluid to said motor, mechanism for controlling the stroke of said pump, means responsive to positional disagreement of said device and object for actuating said valve to control said motor to drive said object toward correspondence with said device, and means responsive to pressure of said fluid for controlling said stroke controlling mechanism comprising a cylinder, a piston within said cylinder connected to said mechanism, a communication from said connection to said cylinder and a spring within said cylinder for actuating said piston.

6. A follow-up control system comprising in combination a pilot device, a driven object, hydraulic driving means for said object comprising a fluid motor connected to said object, a pump and connections between said pump and motor, a differential valve in said connections having two cooperating elements for controlling the supply of fluid to said motor, means responsive to movement of said pilot device for actuating one of said elements to open said valve to control said motor to drive said object toward correspondence with said device, means responsive to movement of said object for actuating the other of said elements to close said valve whereby the amount of the opening of said valve is dependent upon the positional disagreement of said device and object, and anti-hunting means responsive to rate of change of torque of said driving means for controlling said valve mechanism.

7. A control system comprising in combination a pilot device, a driven object, hydraulic driving means for said object comprising a fluid motor connected to said object, a pump, connections between said pump and motor and a valve for controlling the supply of fluid from said pump to said motor, connections between said pilot device and valve whereby said valve is actuated to control said motor to drive said object toward correspondence with said device, means actuated by movement of said object for actuating said valve to stop said motor, a differential device included in the connections between said pilot device and valve and anti-hunting means responsive to rate of change of torque of said driving means and connected to said differential device for controlling said valve.

8. A follow-up system comprising a pilot device, a driven object, hydraulic driving means for said object comprising a fluid motor connected to said object, a pump, connections from said pump to said motor and a differential valve in said connections, means responsive to positional disagreement of said device and object for actuating said valve to cause said motor to drive said object toward correspondence with said device and anti-hunting means comprising a differential device having an output element connected to said valve, a cylinder having a piston connected to one element of said differential device and movable in response to torque of said motor, an eddy current damping device connected to another element of said differential device and having a torque proportional to speed so that said output element is turned through an angle proportional to the rate of change of torque of said motor.

9. A follow-up control system comprising a pilot device, a driven object, hydraulic means for driving said object comprising a fluid motor connected to said object, a pump, connections from said pump to said motor including a differential valve having a pair of cooperating elements, means responsive to movement of said pilot device for applying a torque to actuate one of said elements to open said valve to control said motor to drive said object toward correspondence with said device, means responsive to movement of said object for actuating the other of said valve elements to close said valve and means responsive to the rate of change of torque of said motor for applying an opposing torque to said first mentioned valve element thereby to prevent hunting.

10. A follow-up control system comprising in combination, a pilot device, a driven object, hydraulic driving means for said object comprising a fluid motor connected to said object, a pump, connections from said pump to said motor and a valve in said connections for controlling the supply of fluid to said motor, said valve having a pair of cooperating elements, means responsive to movement of said pilot device for applying a torque to actuate one of said valve elements to open said valve to control said motor to drive said object toward correspondence with said device, means responsive to movement of said object for actuating the other of said elements to close said valve and antihunting means comprising a differential device, a cylinder having a piston movable therein in response to torque of said driving means and connected to one element of said differential device, an eddy current damping device connected to another element of said differential device and developing a torque proportional to speed, and a connection from a third element of said differential device to the actuating means for said first mentioned valve element whereby an opposing torque proportional to rate of change of torque of said driving means is applied to said first mentioned valve actuating means.

11. A follow-up control system comprising a pilot device, a driven object, hydraulic driving means for said object comprising a fluid motor connected to said object, a pump, connections from said pump to said motor and a valve in said connections for controlling the supply of fluid to said motor, electric motor means having a driving connection to said valve, a differential device included in said driving connection, means responsive to movement of said pilot device for energizing said motor means to actuate said valve to control said fluid motor to drive said object toward correspondence with said pilot device, and anti-hunting means comprising a second differential device, a driving connection between the output member of said second differential device and an input member of said first differential device and means for restraining the movement of said connection, a cylinder having a piston movable therein at a rate proportional to the change in fluid pressure and connected to an input element of said second differential device, a damping device connected to a second element of said second differential and exerting a torque proportional to speed so that said driving connection between said differential devices actuates said valve in accordance with the rate of change of torque of said hydraulic driving means.

12. A follow-up control system comprising in combination a pilot device, a driven object, hydraulic driving means for said object comprising a fluid motor connected to said object, a pump, connections between said pump and motor for controlling the supply of fluid to said motor, said valve having two movable elements, an electric pilot motor, a driving connection including a differential device between said pilot motor and one of said elements, means responsive to movement of said pilot device for energizing said pilot motor to effect actuation of said valve to control said fluid motor to drive said object toward correspondence with said pilot device, a driving connection between said fluid motor and the other of said elements for closing said valve as said object is moved toward correspondence with said pilot device, and anti-hunting means comprising a cylinder having a piston movable in accordance with the change of fluid pressure, a damping device having a torque proportional to speed, a second differential device having two of its elements connected to said piston and said damping device and an output element connected to an input element of said first differential device, and restraining means for said output element so that said valve is controlled in accordance with the rate of change of torque of said hydraulic driving means.

13. A follow-up control system comprising a pilot device, a driven object, hydraulic driving means for said object comprising a fluid motor connected to said object and a pump for delivering fluid under pressure to said motor, a differential valve in the supply connections between said pump and motor and having an element arranged to be actuated by movement of said pilot device and a second element connected to said object so that the opening of said valve is dependent upon the positional disagreement of said device and object, and anti-hunting means operable a time interval after actuation of said valve by positional disagreement of said pilot device and driven object for producing an opposite actuation of said valve.

MARTIN A. EDWARDS.